3,541,218
o-FLUOROBENZYLAMINOGUANIDINE
FOR DIABETES
Frederick J. Marshall and Jack Mills, Indianapolis, Ind., assignors to Eli Lilly and Company, Indianapolis, Ind., a corporation of Indiana
No Drawing. Continuation-in-part of application Ser. No. 630,539, Apr. 13, 1967. This application June 18, 1969, Ser. No. 834,506
Int. Cl. A61k 27/00
U.S. Cl. 424—326
4 Claims

ABSTRACT OF THE DISCLOSURE o-Fluorobenzylaminoguanidine and its salts with pharmaceutically acceptable acids are useful hypoglycemic compounds for the treatment of diabetes mellitus.

CROSS-REFERENCE TO PREVIOUS APPLICATIONS

This application is a continuation-in-part of application Ser. No. 630,539, filed Apr. 13, 1967, now abandoned.

BACKGROUND OF THE INVENTION

This invention pertains to the use of o-fluorobenzylaminoguanidine to lower blood sugar in the treatment of diabetes. In 1929, Heyn was granted U.S. Pat. 1,737,192 on the preparation of Synthalin, or decamethylenebisguanidine, a compound possessing blood sugar lowering properties. Shapiro and Freedman, in 1959, published the first work on the now commercially available antidiabetic agent, 1-phenylethylbiguanide, phenformin. More recently, Mull, in U.S. Pat. 3,301,755, disclosed a series of allylic guanidines possessing antidiabetic activity.

It is an object of this invention to provide a safe and effective antidiabetic treatment by the oral administration of o-fluorobenzylaminoguanidine or the pharmaceutically acceptable acid addition salts thereof.

SUMMARY

The compound employed in the method of this invention is o-fluorobenzylaminoguanidine, or a pharmaceutically acceptable acid addition thereof. The said compound and its salts being unexpectedly active as hypoglycemic agents.

The said pharmaceutically acceptable acid addition salt can be prepared by commingling the compound with an equimolar quantity of an acid of the group consisting of hydrogen bromide, hydrogen chloride, sulfuric acid, naphthalenesulfonic acid, phosphoric acid, acetic acid, oxalic acid, tartaric acid, and the like.

o-Fluorobenzylaminoguanidine is prepared by reacting an appropriate salt of aminoguanidine with o-fluorobenzaldehyde (both of which are available commercially), and subjecting the resulting fluorobenzaliminoguanidine salt to chemical reduction or to catalytic hydrogenation. Hydrogenation can be carried out by contacting the salt with a catalyst comprising 5 percent palladium on aluminum oxide in alcohol, glacial acetic acid, or a mixture thereof, in a hydrogen atmosphere of about atmospheric pressure to about 100 p.s.i.g.

o-Fluorobenzylaminoguanidine, as the hydrochloride salt, is a blood sugar lowering agent of such magnitude that 25 mg./kg. injected subcutaneously in guinea pigs caused a 54 mg. percent fall in blood glucose in 5 guinea pigs of a group of 6 and the 6th died from hypoglycemia. The test involved the following procedure:

Guinea pigs previously held without food for 18 hours were bled from a leg vein and a blood glucose level was determined from duplicate samples using the Technicon Autoanalyzer. The compound to be tested was then administered subcutaneously in aqueous solution at a dosage of 25 mg./kg. Six animals were given the test compound, and six animals were given an equal amount of water subcutaneously without the test substance. Duplicate samples of blood were obtained from a leg vein of each guinea pig at 1, 2, 3, 5 and 7 hours after the administration of the drug. The glucose level of each sample was determined, and the results were recorded as the mg. percent decrease of glucose, compared with the controls, for each time period. These results were then averaged and an average mg. percent fall was recorded for each group of 6 animals. The methods of calculation are set forth in detail in the publication Diabetes, 8, 7–13 (1959).

In carrying out the novel therapeutic method of this invention, o-fluorobenzylaminoguanidine or an acid addition salt thereof, is administered to a patient suffering from mild diabetes. The dosage level employed varies according to the need of the patient and severity of the disease. For most patients, the daily administration of from 10–100 mg./kg. of body weight orally or from 0.05–1.00 mg./kg. of body weight intraperitoneally of the aminoguanidine, usually in the form of a non-toxic pharmaceutically-acceptable acid addition salt, serves to reduce the blood sugar to a normal level and maintain it at that level. The appropriate dose can be given at one time during the day or it can be divided into fractional parts and given several times during the day, as for example, with meals. The compound can be given by either the parenteral or oral route. The compound of the present invention is orally effective, however; and the oral method of administration is obviously preferred because of its greater convenience.

The compound, in order to be suitable for oral administration, must be formulated into pharmaceutically acceptable tablets, capsules, elixirs, suspensions, solution, troches, or the like. These pharcameutical forms employ the commonly used extending media and excipients well known to those skilled in the art. In a typical clinical trial, 10 mg. of the hydrochloride salt of the compound herein provided is mixed with a suitable excipient as, for example, starch or milk sugar, filled into a hard-gelatin capsule, and administered orally one to five times a day depending upon the severity of the diabetic state. The hydrochloride salt of the above compound is water soluble and can be administered in liquid form utilizing suitable flavoring agents to mask the undesirable flavor of the compound. Alternatively, a water-insoluble salt, as, for example, the naphthalenesulfonate salt, can be administered as a suspension in an aqueous medium utilizing suitable coloring and flavoring agents.

The following specific compositions are illustrative of those useful in the therapeutic processes of this invention.

Capsules containing o-fluorobenzylaminoguanidine hydrochloride are prepared by thoroughly mixing 2.50 g. of the salt with 52.50 g. of starch, filling the mixture into telescoping hard-gelatin capsules, 0.22 g. of the mixture being placed in each capsule to provide a dose of 10 mg. of a o-fluorobenzylaminoguanidine hydrochloride per capsule.

o-Fluorobenzylaminoguanidine hydrochloride is prepared in tablet form by mixing together 232 g. of the active drug, 1.624 g. of milk sugar, 452 g. of starch, and 12 g. of magnesium stearate, granulating the mixture, and pressing the granulation into scored tablets of such size that each contains about 10 mg. of the active drug.

Capsules containing hydrochloride are prepared by thoroughly mixing 2.85 g. of the drug with 168.15 g. of starch and then filling 550 capsules each with about 0.3 g. of the mixture, thus providing in each capsule a 5 mg. dose amount of the hydrochloride salt.

The following example will illustrate the preparation of the compound useful for the method of the present invention.

EXAMPLE

A mixture of 400 g. of aminoguanidine hydrochloride and 297 g. of o-fluorobenzaldehyde in 1600 ml. of absolute ethanol was heated to reflux by the external application of steam for 3 hours. After cooling, sufficient ether was added to crystallize the resulting product, 1-(o-fluorobenzalimino)guanidine hydrochloride. Yield, 121 g. Melting point 192–194° C.

Two hundred seventeen grams of the o-fluorobenzaliminoguanidine hydrochloride were slurried in a mixture of 1 liter of absolute alcohol and 75 ml. of glacial acetic acid. Ten grams of 5 percent palladium on aluminum oxide were added, and the mixture was agitated in a hydrogen atmosphere for 4 hours at about 5 p.s.i.g. The catalyst was removed by filtration and the filtrate was evaporated in vacuo to an oil. The oil was dissolved in 500 ml. of anhydrous ethanol, and the solvent was removed in vacuo. The resulting oil was again dissolved in 500 ml. of anhydrous ethanol and the small amount of insoluble material was removed by filtration and discarded. Ether was added slowly to the filtrate until evidence of a second phase appeared, and the resulting mixture was allowed to stand at room temperature for 5 days until crystallization was completed. The crystalline solid obtained was o-fluorobenzylaminoguanidine hydrochloride weighing 115 g. and melting at 88–91° C.

We claim:

1. A method of lowering blood sugar in a patient suffering from diabetes which comprises administering to the patient a therapeutically effective dose of o-fluorobenzylaminoguanidine or a pharmaceutically acceptable acid addition salt thereof to reduce the blood sugar to a normal level and maintain it at that level.

2. The method of claim 1 wherein the o-fluorobenzylaminoguanidine is administered orally at a dose of from about 10 to about 100 mg./kg. of body weight.

3. The method of claim 1 wherein the o-fluorobenzylaminoguanidine is administered parenterally at a dose of 0.05 to 1.00 mg./kg. of body weight.

4. The method of claim 1 wherein o-fluorobenzylaminoguanidine is administered as the hydrochloride salt.

References Cited

FOREIGN PATENTS 6505684  11/1965  Netherlands.

ALBERT T. MEYERS, Primary Examiner

J. D. GOLDBERG, Assistant Examiner